United States Patent [19]
Polanyi et al.

[11] Patent Number: 5,122,910
[45] Date of Patent: * Jun. 16, 1992

[54] DEVICE FOR ADJUSTING AUTOMOBILE SIDE VIEW MIRROR

[76] Inventors: Michael L. Polanyi; Thomas G. Polanyi, both of 105 Vaughn Hill Rd., Bolton, Mass. 01740

[*] Notice: The portion of the term of this patent subsequent to Jun. 11, 2008 has been disclaimed.

[21] Appl. No.: 620,350

[22] Filed: Nov. 28, 1990

Related U.S. Application Data

[63] Continuation of Ser. No. 431,917, Nov. 6, 1989, Pat. No. 5,022,747.

[51] Int. Cl.⁵ .................................................. G02B 5/08
[52] U.S. Cl. ........................................ 359/865; 359/850
[58] Field of Search ............... 350/612, 616, 626, 631, 350/632, 635; 359/865, 850

[56] References Cited

U.S. PATENT DOCUMENTS 4,293,191 10/1981 Kim ..................................... 350/632
4,311,363 1/1982 Marsalka et al. ................... 350/631

Primary Examiner—Scott J. Sugarman
Assistant Examiner—J. P. Ryan
Attorney, Agent, or Firm—Michael J. Striker

[57] ABSTRACT

A device for adjusting a side view mirror of an automobile has an auxiliary mirror arranged on the side view mirror and having a reflective surface inclined relative to the reflective surface of the side view mirror so that when the driver sees an image of a target on the automobile body in the auxiliary mirror the line of sight of a driver looking in the side view mirror is directed toward a required blind spot area near the automobile.

3 Claims, 10 Drawing Sheets

DEVICE FOR ADJUSTING AUTOMOBILE SIDE VIEW MIRROR

This is a continuation of application Ser. No. 431 917 filed Nov. 6, 1989. Now U.S. Pat. No. 5,022,747.

BACKGROUND OF THE INVENTION

The present invention relates to a device for adjusting automobile side view mirrors.

The driver of a motor vehicles needs to monitor the traffic in the rear of his vehicle travelling in his direction. As a rule a vehicle 1 shown in FIG. 1 is provided with two mirrors for this purpose. A rear view mirror 2 is mounted inside the vehicle in front above and slightly to the right of a driver 3. A side view mirror 4 is mounted outside the vehicle in front and slightly to the left of the driver. The proper adjustment of the rear view mirror to present to the driver a full view of the road and the traffic behind him presents as a rule no problem. However, the view offered by this rear view mirror within the angle $\alpha$ does not include a portion of the left lane and the area to the left and immediately behind the vehicle 1 within an angle $\beta$. This is a well known "blind spot". The importance of being able to visualize a car 5 or an obstacle located in the blind spot is well known.

The proper adjustment or aiming of the side view mirror 4 is as a rule a subjective procedure and presents certain difficulties to some drivers. Some car manufacturers recommend to adjust a side view mirror to the center of an adjacent lane of traffic with a slight overlap of the view obtained in the inside mirror. The procedure which is commonly used for adjusting the side view mirror without an object in the blind spot includes first aiming the side view mirror to visualize the tail end of the car 1 and then tilting the mirror a "little bit" with the hope that it will afford a view of the car 5 or other object located in the blind spot. The problem with this procedure is that as a rule there is no target to aim at.

Another procedure is to adjust the side view mirror while driving. In this case, the driver must wait for a car 5 properly located in the blind spot, aim the side view mirror 4 at the moving car 5, and to exercise judgement, during which procedure his eyes must wonder away from the road in front of him. This is an uncertain and hazardous procedure.

The same is true with respect to a side view mirror which is mounted outside the vehicle in front and slightly to the right of the vehicle.

SUMMARY OF THE INVENTION

Accordingly it is an object of the present invention to provide means which enable a driver to orient properly his side view mirror using the conventional mechanisms provided for adjusting the side view mirror and in a simple, reliable and safe manner.

In keeping with these objects and with others which will become apparent hereinafter, one feature of the present invention resides, briefly stated, in a device for adjusting a side view mirror of an automobile, which includes an auxiliary mirror arranged on the side view mirror and having a reflective surface inclined relative to the reflective surface of the side view mirror so that when the driver sees an image of a target on the automobile body in the auxiliary mirror the line of sight of a driver looking in the side view mirror is directed toward a required blind spot area near the sutomobile.

When the device is designed in accordance with the applicant's invention, the side view mirror is adjusted objectively, and in a simple, reliably and safe manner.

It is another feature of the present invention to provide a method of adjusting a side view mirror which includes providing an auxiliary mirror arranged on the side view mirror and having a reflective surface inclined relative to the reflective surface of the side view mirror so that when the driver sees an image of a target on the automobile body in the auxiliary mirror the line of sight of a driver looking in the side view mirror is directed toward a required blind spot area near the automobile.

It is to be understood that the proposed device can be used for side view mirrors arranged at the left side and at the right side of an automobile.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
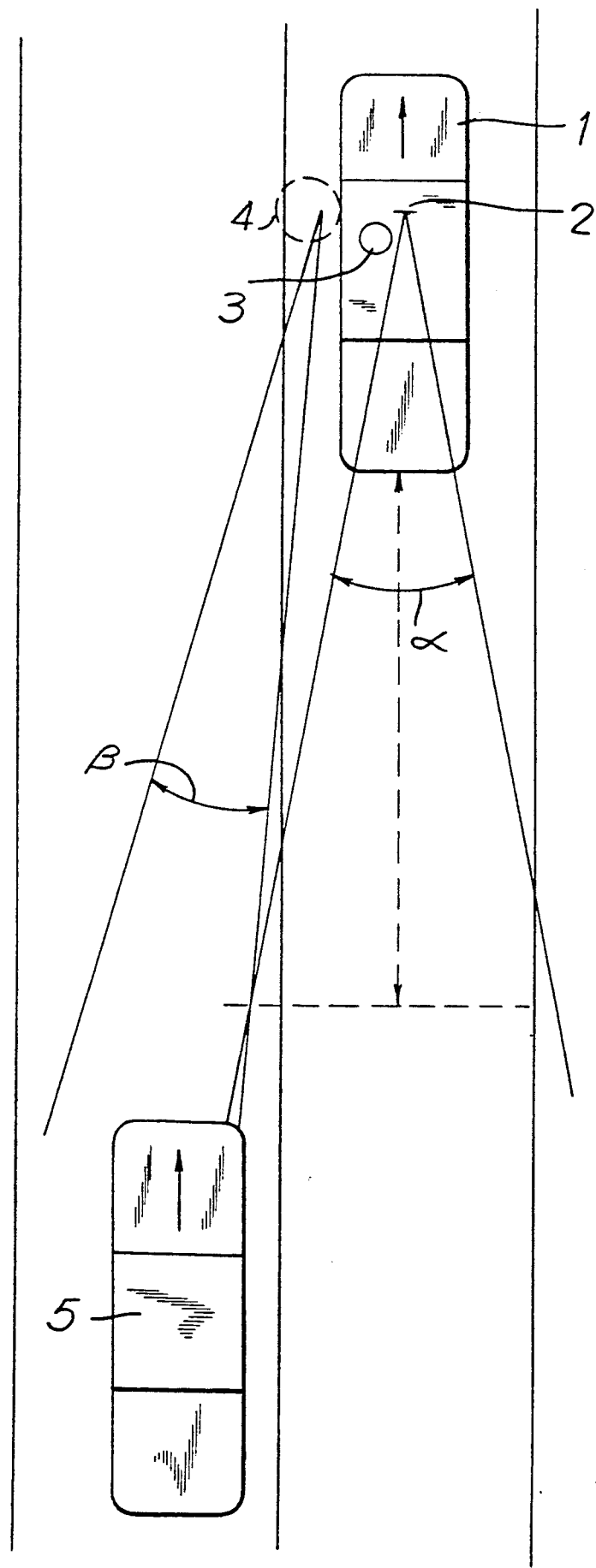
FIG. 1 is a view which generally shows a traffic situation with two cars and areas which must be covered by a rear view mirror and a side view mirror.
Figure 2:
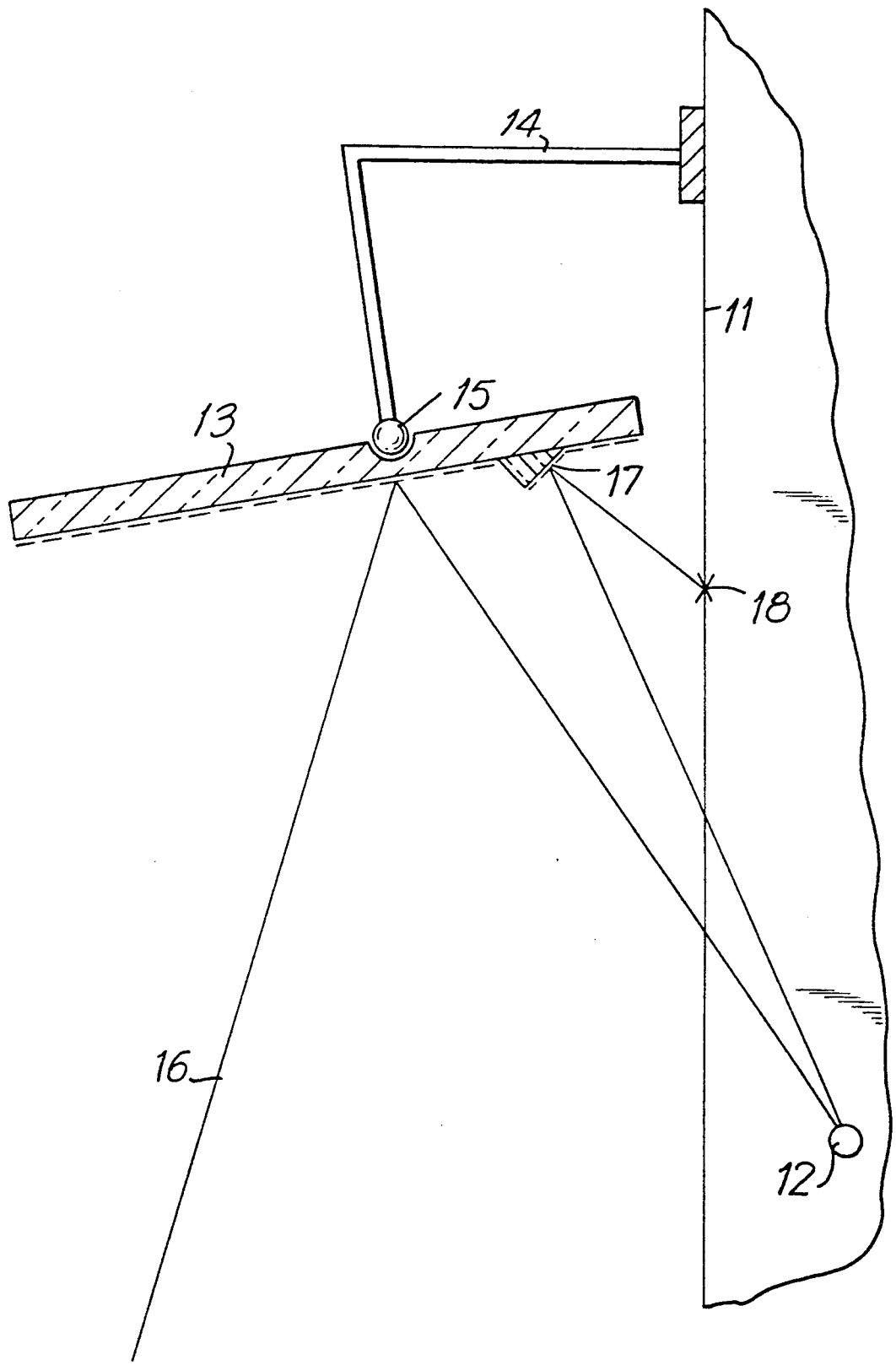
FIGS. 2 and 3 are a plan view and a perspective view of a device for adjusting a side view mirror in accordance with a first embodiment of the present invention.
Figure 3:
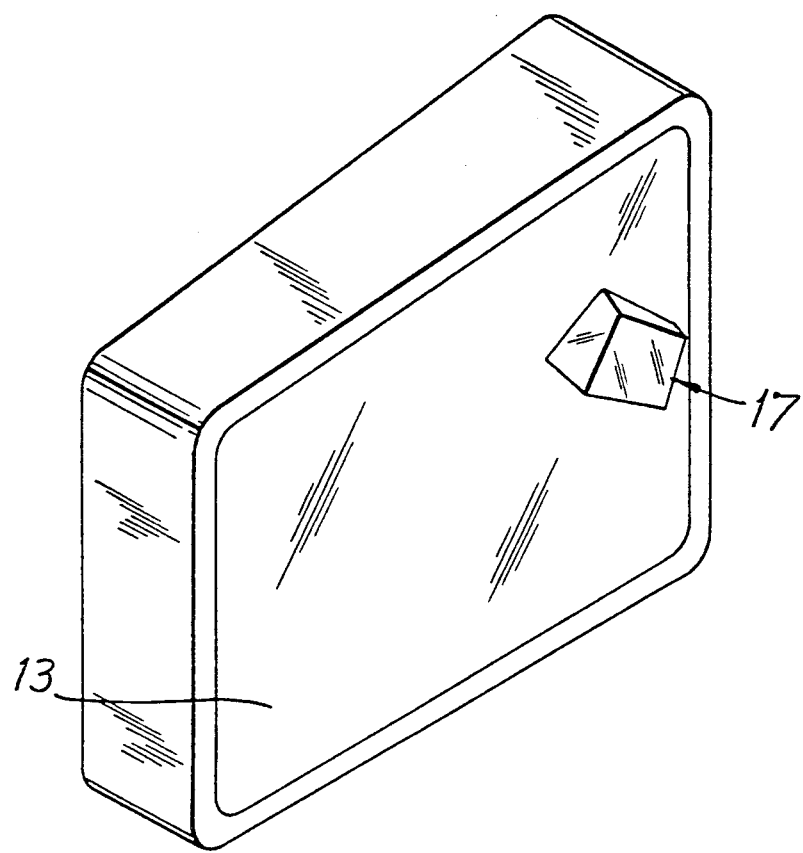

As can be seen from FIG. 2 a car 11 which is driven by a driver 12 is provided with a side view mirror 13 which is pivotally mounted on the car. The mounting is performed in such a way as to insure that the pivot is fixed with respect to the car, for example by means of bracket 14 which is fixedly connected with the car and has a pivot 15 at its end for pivotally supporting the side view mirror 13. The side view mirror 13 must be adjusted so that a standard driver 12, i.e., a driver of average stature sitting in a normal driving position, can see a blind spot area 16. In accordance with the present invention, a small auxiliary mirror 17 is provided on the side view mirror 13, and a target 18 is provided on the car 11, in a selected point of the car. A ball-and-socket pivot joint is shown in this Figure. However it is to be understood that other pivoting means can also be used.

The position of the auxiliary mirror 17 on the side view mirror 13 and the position of the target 18 on the car are selected so that when the side view mirror is adjusted to a required area, in particular to the blind spot, the standard driver also sees the target 18 in the auxiliary mirror 17. The positions of the auxiliary mirror 17 and the target 18 are to be selected and controlled when the device is installed on a car.

If for any reason the driver 12 does not see the target 18 in the auxiliary mirror 17, the driver 12 will adjust the side view mirror by repositioning the side view mirror 13 until he will again see the target 18 in the auxiliary mirror 17. Thus, in accordance with the present invention, he no longer needs to point the side view mirror to an adjacent lane or an uncoming car, but instead makes sure that the target 18 is clearly seen in the auxiliary mirror 17 which is achieved in a simple, reliable and safe manner.

Figure 4:
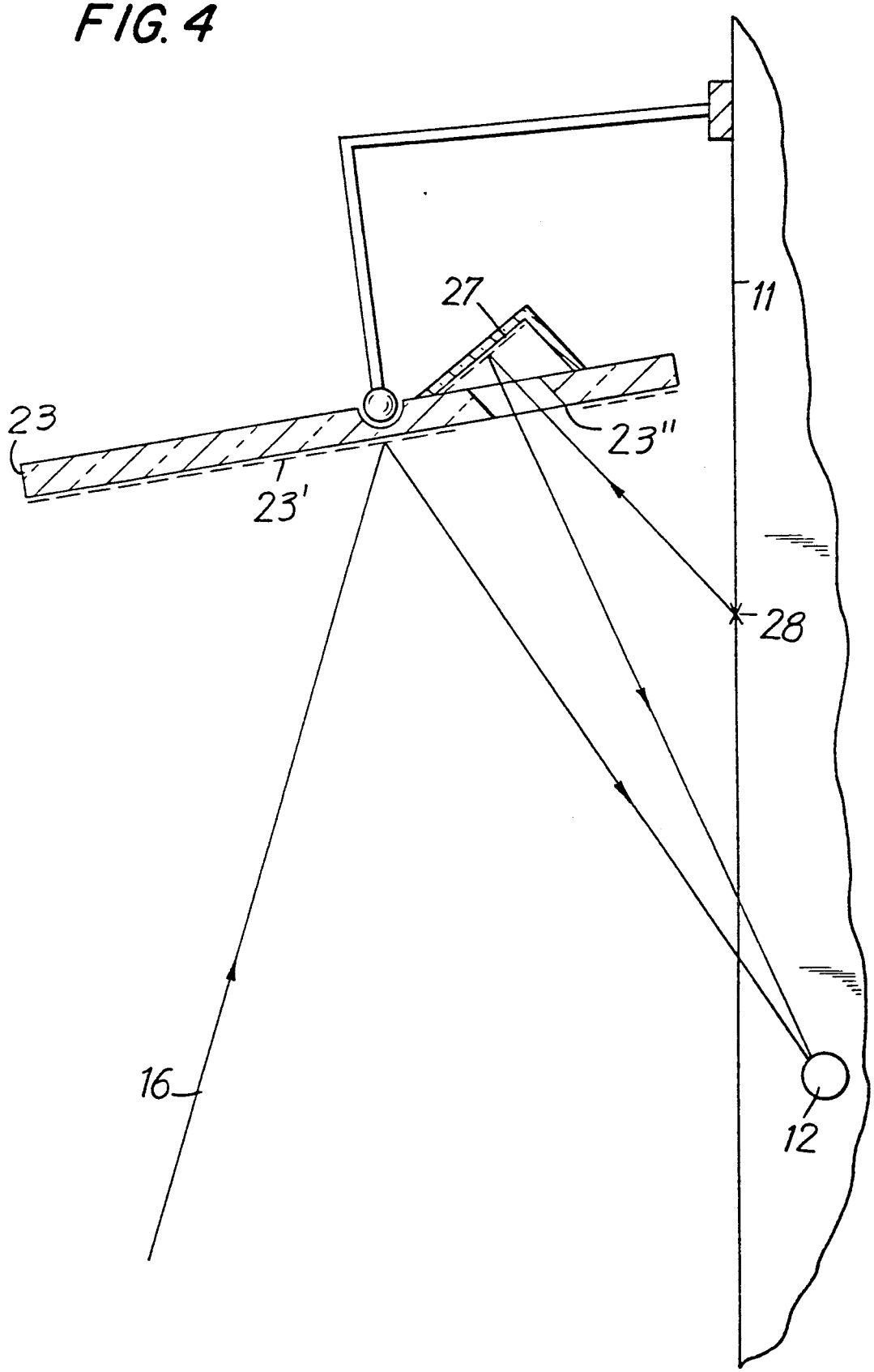
FIG. 4 is a view showing the device for adjusting a side view mirror in accordance with a second embodiment of the present invention.

FIG. 4 shows another embodiment of the device in accordance with the present invention. Here the car 11 is also provided with a target 28 and has a side view mirror 23. The side view mirror 23 has a reflecting surface 23' over its major area and a transparent portion in its smaller area 23". An auxiliary mirror 27 is arranged behind the side view mirror 23 so that its reflecting surface can be seen through the transparent portion 23" of the side view mirror 23. The device operates in the same manner as the device shown in FIG. 2. A driver 12 adjusts the side view mirror 23 so that he can see the target 28 in the auxiliary mirror 27. In this position the side view mirror covers the area of the blind spot. It will be understood that the reflective portion 27 can be the rear face of a prism of appropriate shape attached to the rear face of the side view mirror 23.

It is to be understood that the auxiliary mirror can be formed on the side view mirror in many different ways. It can be formed as an additional part which is attached to the side view mirror by conventional methods, for example mechanical connections, chemical bonds, etc. On the other hand, the auxiliary mirror can be formed of one-piece with the side view mirror as an integral part of the latter. As can be seen in the drawings, the reflecting surface of the auxiliary mirror is inclined at a certain angle to the reflecting surface of the side view mirror so that when the side view mirror displays to the driver an image of the area of the blind spot, the auxiliary mirror displays to him the image of the target. As for the target, it can be also formed in many different ways, for example by making a mark on a body of the car, attaching an additional part to the body of the car, etc. To permit viewing of the target in darkness, a target illuminating means may be added. They can be formed as separate means directing light onto the target, or the target itself can be luminescent or similar means visible in darkness.

The preceding embodiments are suitable for such side view mirrors which are movable about a pivot point real or virtual located substantially in its own plane and fixed with respect to the car, and restricted from rotating in its own plane.

Figure 5:
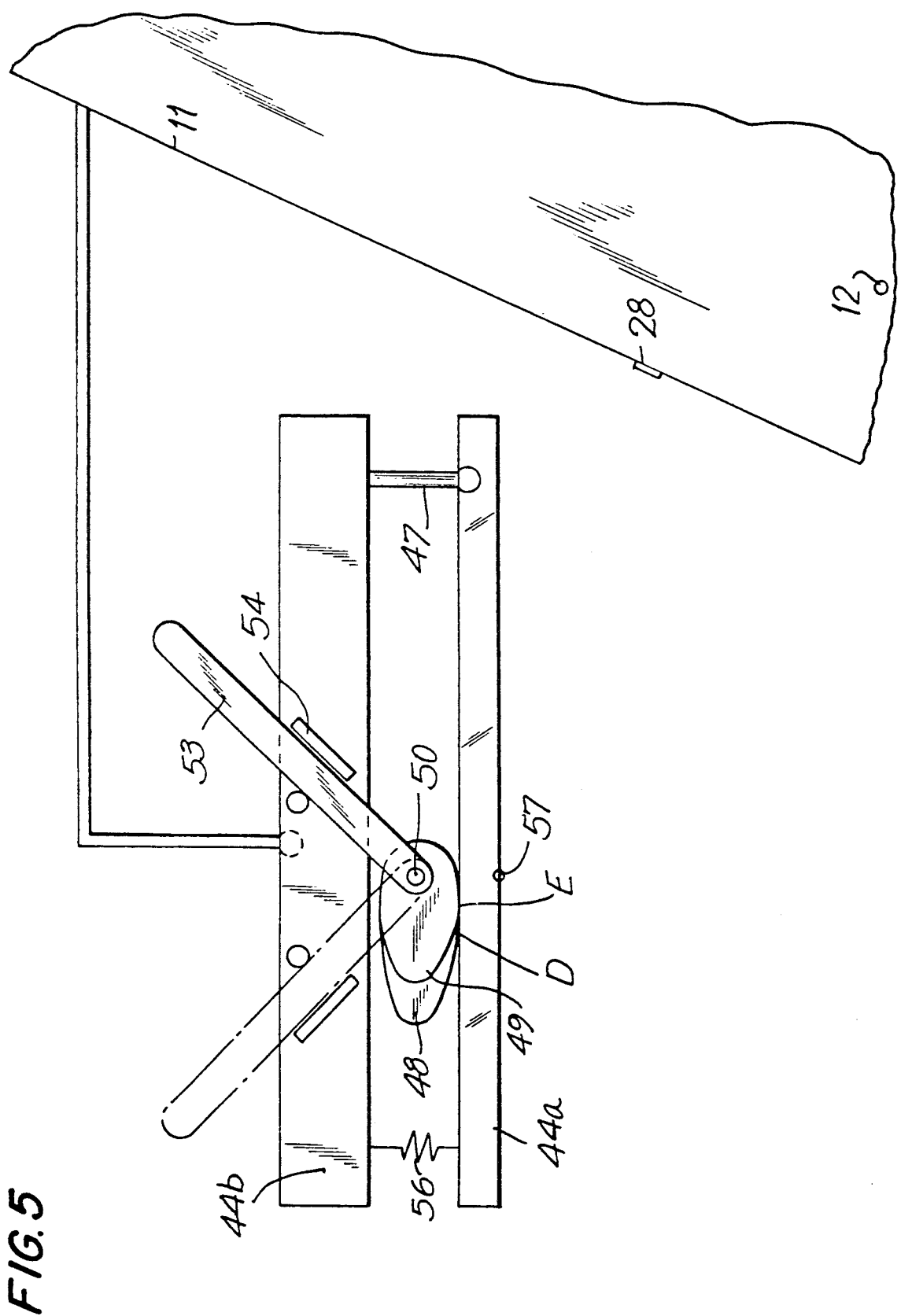
FIGS. 5-7 are views showing a device for adjusting a side view mirror in accordance with a third embodiment of the present invention.
Figure 6:
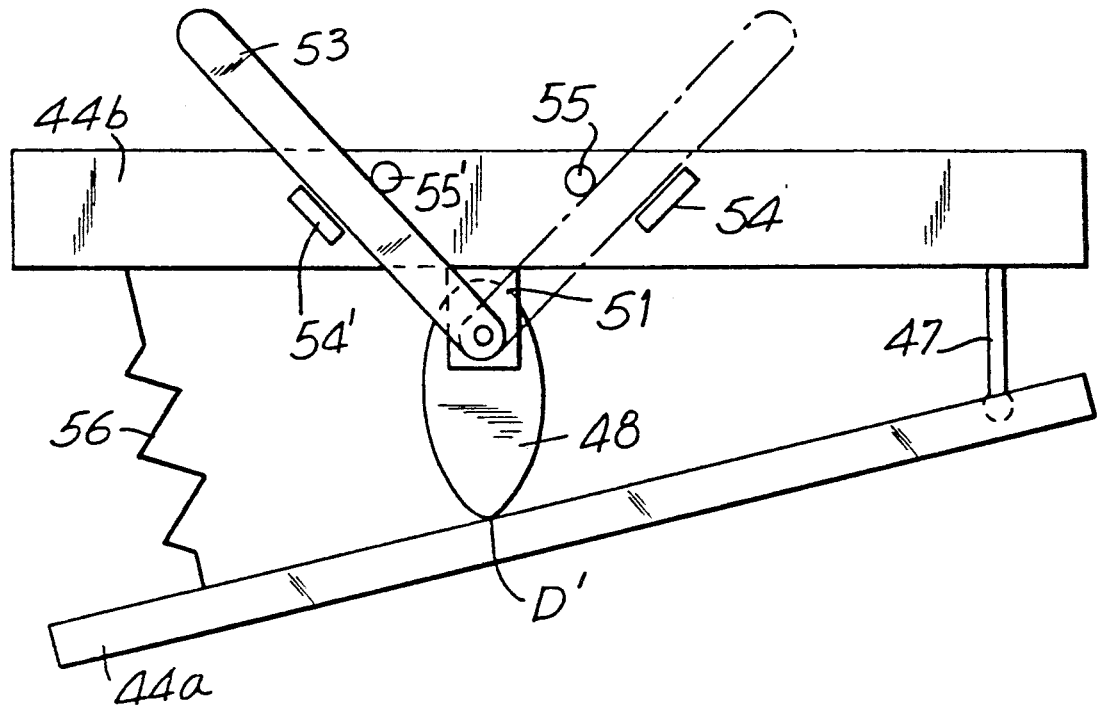
Figure 7:
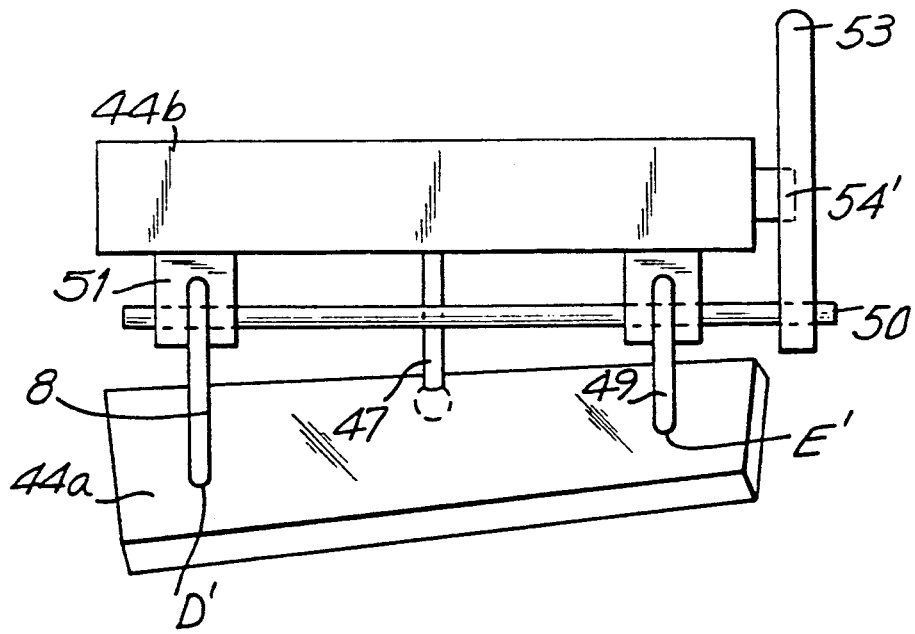

A further embodiment of the present invention is shown in FIGS. 5-7, wherein FIG. 5 shows a working position of the side view mirror, FIG. 6 shows the adjusting position of the side view mirror, and FIG. 7 shows a side view. The side view mirror 44a with a marker 57 is connected to a base plate 44b in a manner that allows the mirror 44a to assume selected positions shown in FIGS. 5 and 6 with respect to the base plate 44b. This is accomplished by means of the ball-and-socket joint mechanism 47 and two cams 48 and 49. These cams are rigidly connected at two selected locations to rotatable shaft 50 fixed with respect to the base plate 44b by means of appropriate posts 51 (FIG. 7). A handle 53 is also rigidly connected with the shaft 50 and is perpendicular to it. The moving handle 53 will cause the shaft 50 to rotate. The cams are so dimensioned that in the position shown in FIG. 5 of the handle, the mirror 44a assumes a first orientation with respect to the base 44b as shown in FIG. 5. The position of the mirror is completely determined by the position of the ball-and-socket joint mechanism 47 and by the two points of contact of the mirror 44a with the cams 48 and 49. Contact between the mirror 44a and the cams is maintained by an appropriate spring 56. These points of contact are indicated as D and E in FIG. 5 and D' and E' in FIGS. 6 and 7, respectively. A stop 54 and a spring-loaded ball 55 fix the location of the handle 53 corresponding to the position shown in FIG. 6.

When the handle 53 is rotated away from the stop 54, the cams 48 and 49 rotate and the mirror 44a constrained by the spring 56 to contact the cams displaced from the position shown in FIG. 5. FIG. 6 which for the sake of simplicity depicts only one cam, shows the position of the mirror 44a with respect to the base 44b when the handle 53 is rotated by a predetermined angle fixed by the stop 54' and the detent 55'. For a fixed position of the base 44b, or in other words the position which permits a driver of the car to see a desired area in the blind spot with the mirror 44a in the position shown in FIG. 5, it becomes necessary to have two approximately perpendicular angular adjustments for the mirror 44a with respect to the base 44b to enable the driver to see in the mirror 44a the image of the auxiliary target 28 on the car 11 coinciding with the marker 57 when the turn lever 53 from stop 54 (FIG. 5) to stop 54' (FIG. 6). This is accomplished by the design of the cams 48 and 49. The action of these cams is shown in FIG. 7. It will be appreciated from this Figure that the difference in length of the two cams determines one of the angles of the mirror 44a with respect to the base 44b, and that the angle in a generally perpendicular direction is determined by the average height of the cams 48 and 49 above the mirror 44a and by the distance between the shaft 50 and the ball-and-socket joint mechanism 47. The fixed angular relationship between the two mirror positions is selected when the inventive device is installed.

In practice, a driver moves the mirror 44a from the position shown in FIG. 5 to the position shown in FIG. 6, and then displaces the whole unit so that the target 28 (FIG. 5) on the car can be seen to coincide with the marker 57 in the mirror 44a. Then, the driver snaps the mirror 44a back to the position shown in FIG. 5 using lever 53. The mechanisms for adjusting base plate 44b are subject to the identical conditions which hold for adjusting the side view mirror of the other embodiments.

It will be understood that many variations exist for this embodiment. It should also be mentioned that electrical means for adjusting the mirror in this fashion can equally be used for obtaining the object of this invention. This applies in particular to those side view mirror adjustment mechanisms in which adjustment is obtained by electrical motors controlled by pushbutton controls located on the dashboard of the car. Additional preset electrical signals to the motors can be used to accomplish the "flip-flop" movement.

Figure 9:
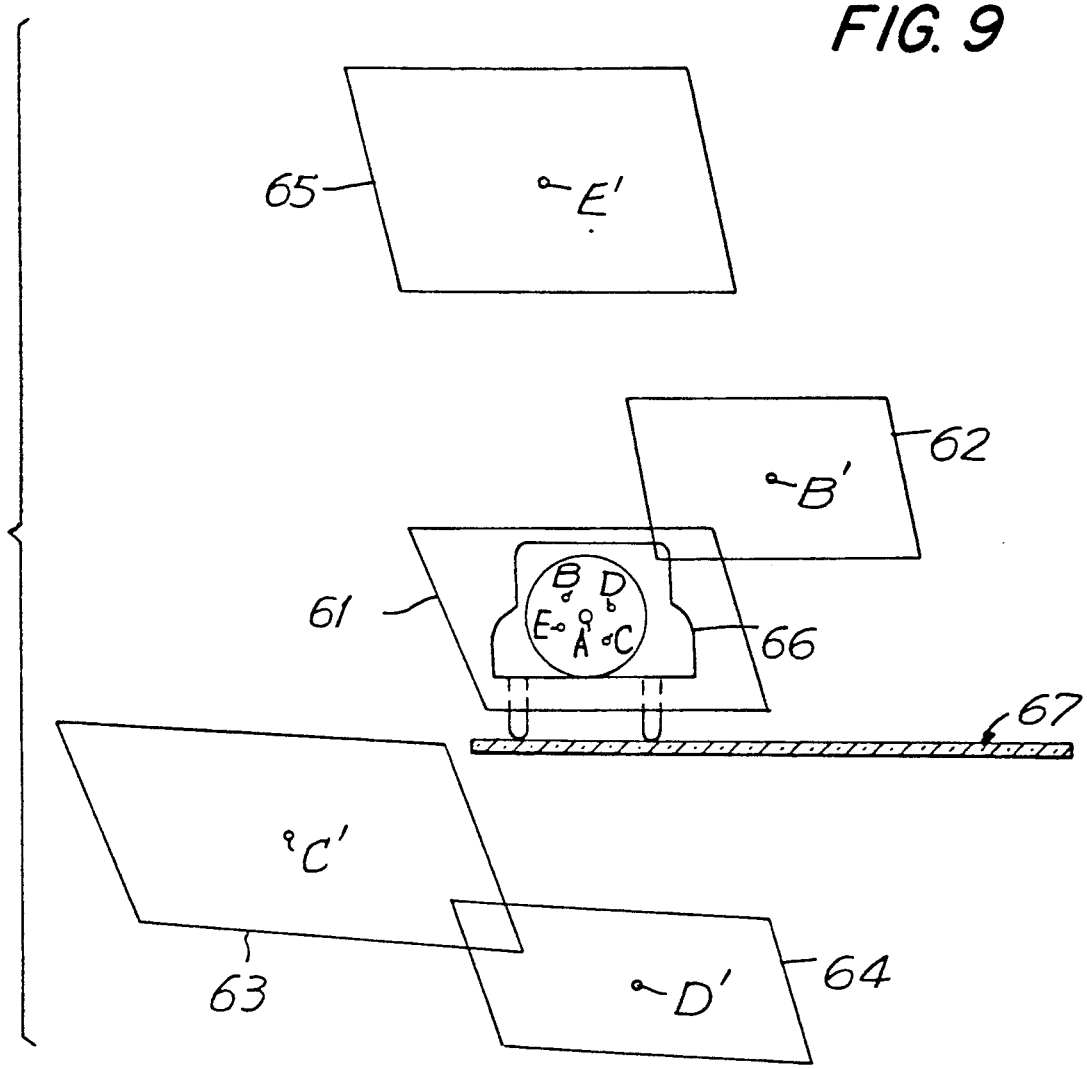
FIGS. 8-9 are views illustrating substantial differences in the area seen in the side view mirror adjusted for the standard driver by drivers different from a standard driver, and also showing how these variations become negligible after adjustment of the side view mirror in accordance with the present invention.
Figure 8:
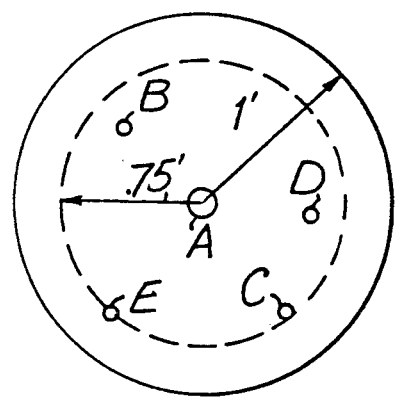
Figure 10:
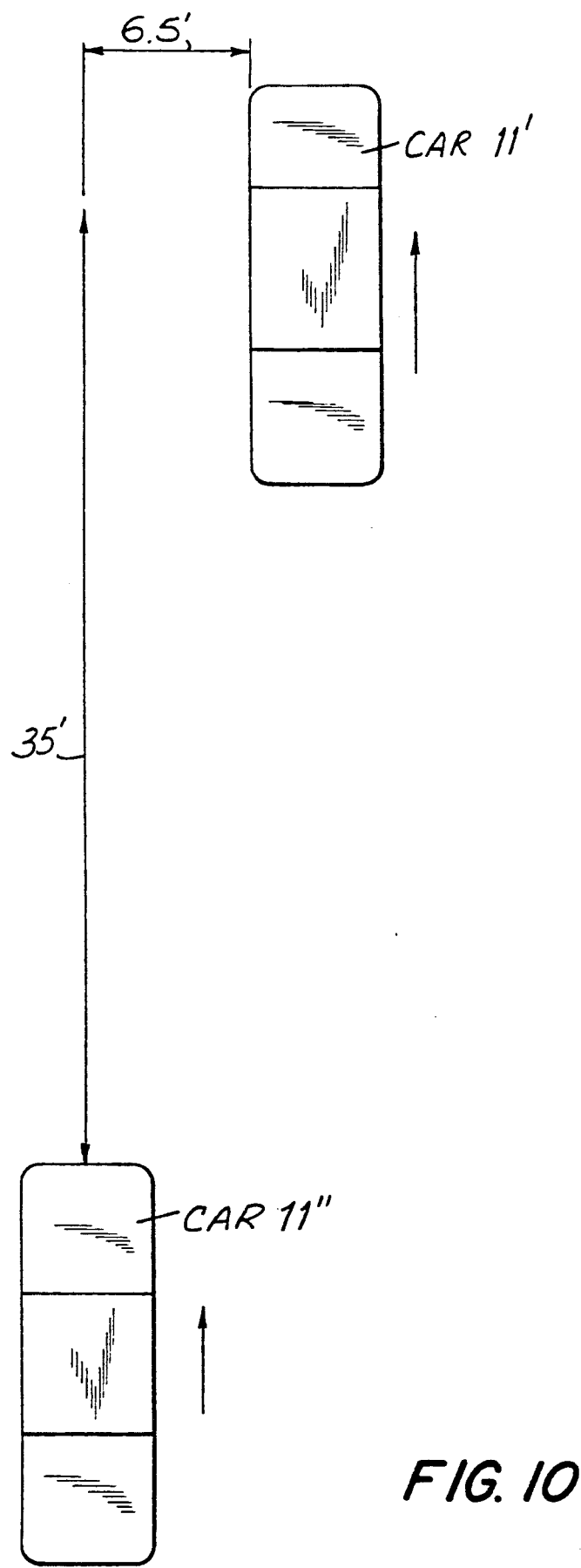
FIG. 10 shows the relative position of the cars leading to the side view images shown in FIGS. 8-9.

FIGS. 8-10 illustrate the variations of the centers of the field seen by drivers who are different from the standard driver and who have adjusted the side view mirrors according to the present invention. Point A here is the center of the field 61 selected by the standard driver in the blind spot, while points B, C, D and E are the centers of the fields seen by these other drivers after adjustment of the side view mirror. Also shown are the fields 62, 63, 64 and 65 centered around the points B', C', D' and E', as seen by these other drivers looking in the side view mirror as left adjusted for the standard driver. The fields of view 62, 63, 64 and 65 are those which are seen respectively in the side view mirror by a driver who is 8 inches back from the standard position, a driver who is 8 inches forward of the standard position, a driver who is 8 inches higher than the standard driver, and a driver who is 8 inches lower than the standard driver, respectively.

It can be seen from FIG. 8 and in better detail in FIG. 9 that a selected spot of the oncoming car 11" (FIG. 10) or another selected point in the blind spot will only insignificantly deviate on the side view mirror of the car provided with the inventive device, for drivers who are different from the standard driver or who are in positions which are different from the standard position. The various fields of view shown in FIGS. 8 and 9 were determined for the relative positions of cars 11' and 11" shown in FIG. 10. It is understood that the appropriate region of the blind spot to be visualized in the side view mirror varies with the geometry of the car and the view afforded by the rear view mirror. These changes will affect the details shown in FIG. 8, but will not affect the overall usefulness of the device described.

The method of adjustment of the side view mirror in accordance with the present invention is suitable for side view mirrors having the following characteristics:

the pivot point is fixed with respect to the car as mentioned earlier, and is located substantially in the plane of the mirror;

the side view mirror is free to move in its pivot, but is prevented from rotating in its own plane.

In many present day side view mirrors the pivot is located substantially at the center and in the plane of the side view mirror and the movements of the mirror are limited to rotations around two axes substantially perpendicular to each other.

In the embodiments heretofore described a single target on the car was considered. The automobile, however, may be provided with more than one target thus enabling drivers to select areas in the blind spot that best suit their driving habits, traffic conditions or other considerations such as e.g. an object limiting the view afforded by the rear view mirror.

Figure 11:
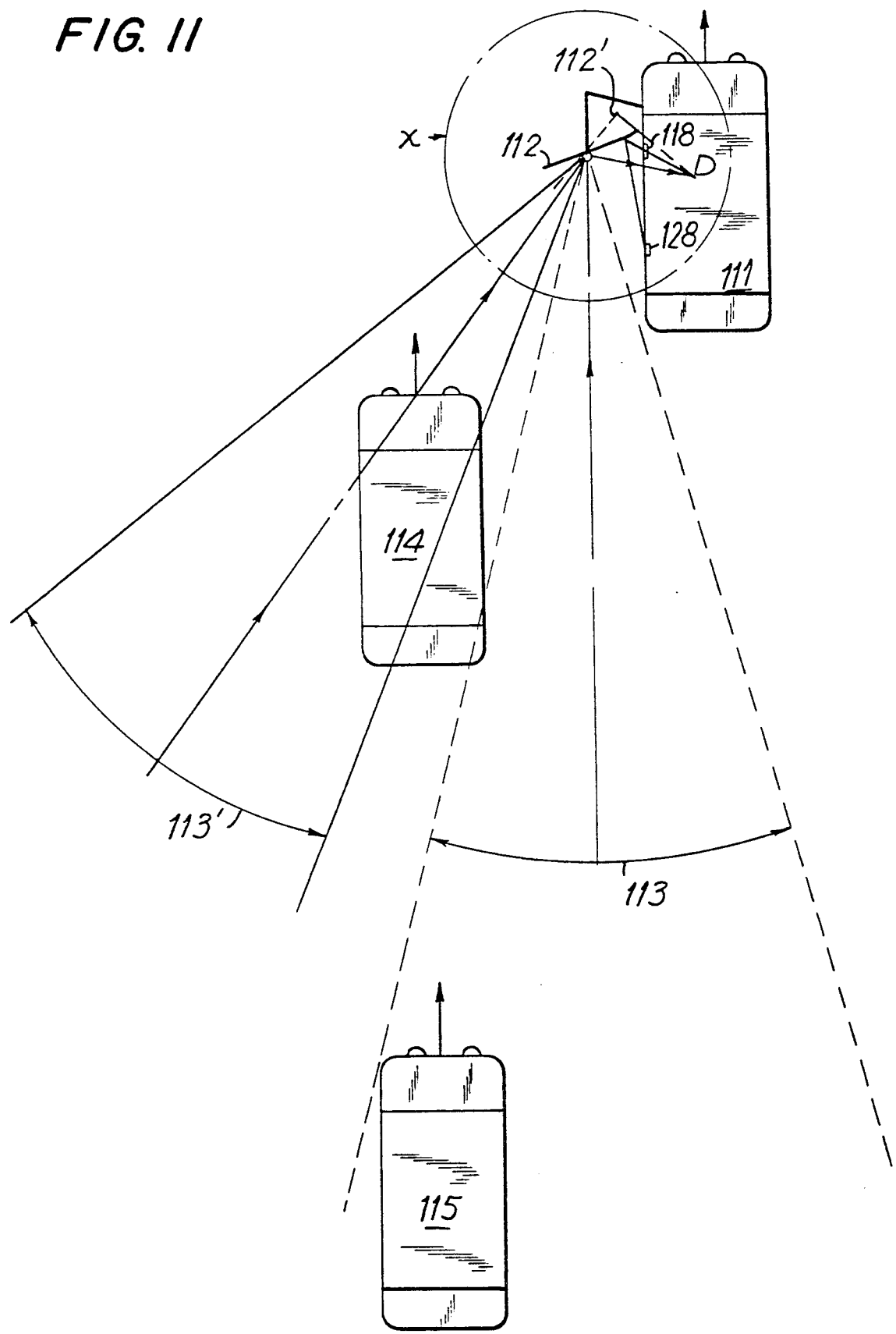
FIGS. 11 and 12 are views showing the inventive device with two targets.
Figure 12:
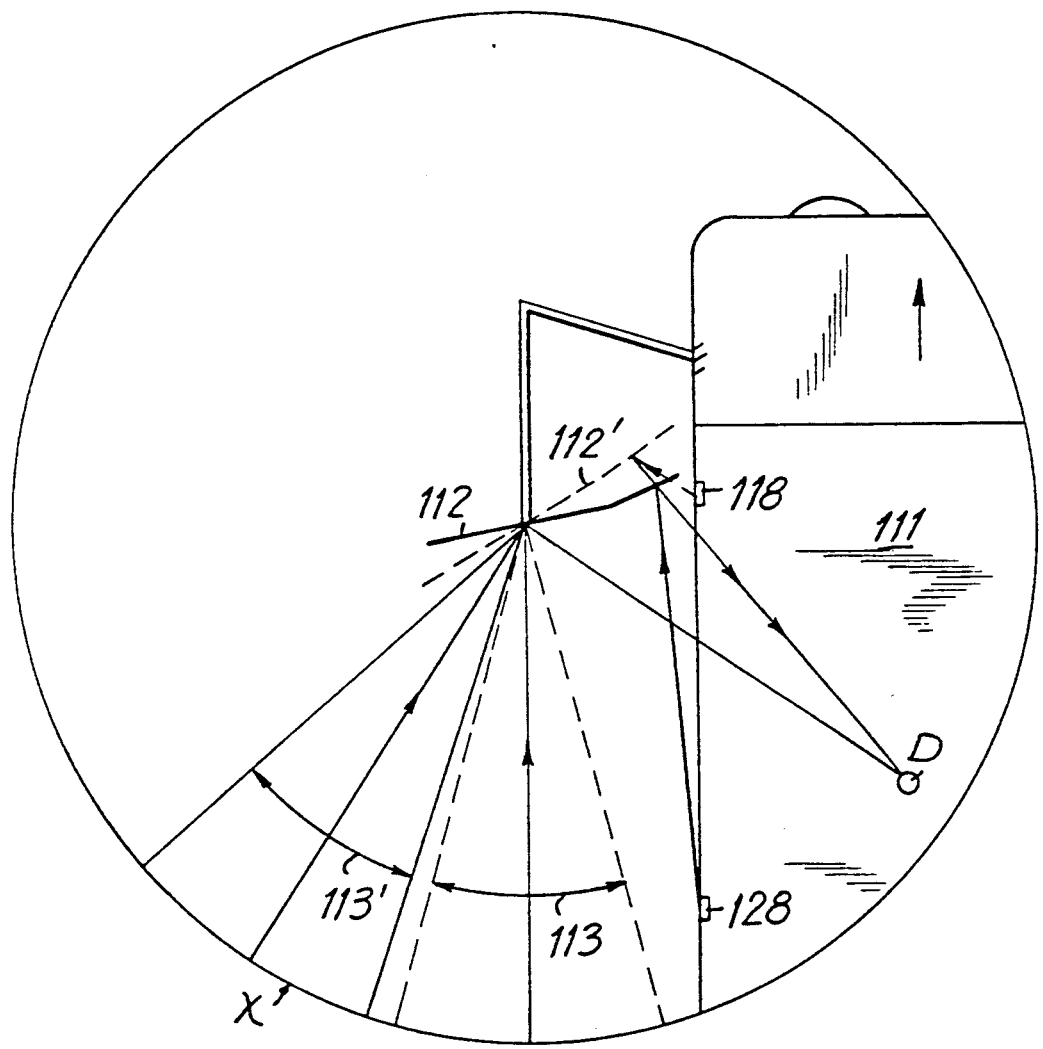

FIG. 11 as well as FIG. 12 which shows a detail of FIG. 11 illustrate a device with two targets 118 and 128 provided on the car 111.

The side view mirror and auxiliary mirror assembly indicated only schematically in FIGS. 11 and 12, should be understood to be identical with any of the inventive embodiments of FIGS. 2, 4, and 5. With the provision of two targets the driver can visualize two different views of the traffic in the rear of his car according to various traffic conditions or other considerations. When the driver of the car 111 orients the side view mirror to see target 128 in the auxiliary mirror for example, he sees the area indicated by 113 in FIG. 11 which includes car 114. When the driver of car 111 adjusts the side view mirror so that it assumes the position shown by a broken line and identified with reference numeral 112', and he sees the target 128 he visualizes in the side view mirror the area 113 and the car 115 in this area. Car 114 is located in the blind spot area close to his car, while car 115 is located further in the rear of his car.

It will be understood that each of the elements described above, or two or more together, may also find a useful application in other types of constructions differing from the types described above.

While the invention has been illustrated and described as embodied in a device for asjusting a side view mirror of an automobile, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A side view mirror assembly for an automobile, comprising a side view mirror; and an auxiliary mirror attached to the side view mirror and having a reflective surface considerably smaller than that of the side view mirror and so inclined with respect to said side view mirror that it enables a driver of an automobile to see in said auxiliary mirror a target provided on said automobile and that when said target is seen by the driver in said auxiliary mirror the line of sight of said driver looking in the said view mirror is directed toward a required blind spot area near the automobile.

2. A device for adjusting a side view mirror of an automobile comprising a support for movably supporting a side view mirror relative to an automobile body; and means for supporting said side view mirror turnably relative to said support between an adjusting position and a final position which bear a predetermined angular relationship to each other, so that when said side view mirror is in said adjusting position and said support is moved by a driver so that a target provided on an automobile body is seen by said driver to coincide with a marker provided on said side view mirror, said side view mirror can then be turned by the automobile driver to said final position in which a line of sight of the driver looking in said side view mirror is directed to a required blind spot area near the automobile.

3. A device as defined in claim 2; and further comprising a second target positioned on the automobile body at a distance from the first mentioned target and such that when the driver of the automobile sees said second target in the auxiliary mirror he will see in the side view mirror a second selected area in the blind spot near his automobile.

* * * * *